US012640636B2

(12) United States Patent
Gong et al.

(10) Patent No.: US 12,640,636 B2
(45) Date of Patent: May 26, 2026

(54) VOICE COIL MOTOR, ZOOM LENS AND PHOTOGRAPHY DEVICE

(71) Applicant: ZHONGSHAN UNION OPTECH RESEARCH INSTITUTE CO., LTD., Zhongshan (CN)

(72) Inventors: Junqiang Gong, Zhongshan (CN); Meijiao Zhao, Zhongshan (CN); Shengping Qiu, Zhongshan (CN); Kun Li, Zhongshan (CN); Minde Li, Zhongshan (CN); Hao Wang, Zhongshan (CN)

(73) Assignee: ZHONGSHAN UNION OPTECH RESEARCH INSTITUTE CO., LTD., Zhongshan (CN)

( * ) Notice: Subject to any disclaimer, the term of this patent is extended or adjusted under 35 U.S.C. 154(b) by 303 days.

(21) Appl. No.: 18/411,966

(22) Filed: Jan. 12, 2024

(65) Prior Publication Data

US 2024/0162797 A1    May 16, 2024

Related U.S. Application Data

(63) Continuation of application No. PCT/CN2023/131826, filed on Nov. 15, 2023.

(30) Foreign Application Priority Data

Nov. 15, 2022    (CN) .......................... 202211426779.4

(51) Int. Cl.
*H02K 41/035*    (2006.01)
*G02B 7/08*    (2021.01)
*H02K 33/18*    (2006.01)

(52) U.S. Cl.
CPC ........... *H02K 41/0354* (2013.01); *G02B 7/08* (2013.01); *H02K 33/18* (2013.01)

(58) Field of Classification Search
CPC .............. H02K 41/0354; H02K 33/18; H02K 41/0356; G02B 7/08
(Continued)

(56) References Cited

U.S. PATENT DOCUMENTS 8,830,604 B2 *    9/2014    Sato ....................... G02B 7/102
                                                         359/824
9,063,275 B2 *    6/2015    Park ......................... G02B 7/08
(Continued)

FOREIGN PATENT DOCUMENTS

CN        113497540 A        10/2021
CN        115694118 A        2/2023
(Continued)

OTHER PUBLICATIONS

International Search Report and Written Opinion issued in corresponding PCT Application No. PCT/CN2023/131826, dated Jan. 26, 2024.

*Primary Examiner* — Mohammed A Hasan
(74) *Attorney, Agent, or Firm* — Westbridge IP LLC

(57)        ABSTRACT

Disclosed are a voice coil motor a zoom lens and a photography device. The voice coil motor includes a machine shell, a magnet structure, a mover structure and a drive structure. The magnet structure is provided on the machine shell and includes an annular magnetic yoke. The mover structure includes a plurality of mover coils, and the plurality of mover coils are movably sleeved on a yoke section of the annular magnetic yoke. The drive structure includes a plurality of drive chips and the plurality of drive chips are electrically connected to the plurality of mover coils respectively.

9 Claims, 3 Drawing Sheets

(58) Field of Classification Search
USPC ........................................................ 359/814
See application file for complete search history.

(56)                      References Cited

U.S. PATENT DOCUMENTS

| | | | | |
|---|---|---|---|---|
| 2003/0035094 A1* | 2/2003 | Hazelton | ............. | G03F 7/70766 |
| | | | | 355/75 |
| 2008/0144198 A1 | 6/2008 | Sato | | |
| 2013/0120860 A1 | 5/2013 | Sato | | |
| 2015/0160426 A1* | 6/2015 | Chao | .................. | H02K 41/0356 |
| | | | | 359/824 |
| 2023/0400751 A1* | 12/2023 | Shikama | ................ | G03B 13/36 |

FOREIGN PATENT DOCUMENTS

| | | | |
|---|---|---|---|
| CN | 219107275 U | 5/2023 |
| JP | 2000321475 A | 11/2000 |
| JP | 2004343853 A | 12/2004 |
| JP | 2007028833 A | 2/2007 |
| JP | 2011123432 A | 6/2011 |
| JP | 2016122044 A | 7/2016 |

\* cited by examiner

VOICE COIL MOTOR, ZOOM LENS AND PHOTOGRAPHY DEVICE

CROSS-REFERENCE TO RELATED APPLICATIONS

This application is a continuation application of International Application No. PCT/CN2023/131826, filed on Nov. 15, 2023, which claims priority to Chinese Patent Application No. 202211426779.4, filed on Nov. 15, 2022. The disclosures of the above-mentioned applications are incorporated herein by reference in their entireties.

TECHNICAL FIELD

The present application relates to the technical field of photography devices, and in particular, to a voice coil motor, a zoom lens and a photography device.

BACKGROUND

A voice coil motor is a device that converts electrical energy into mechanical energy and achieves linear and limited swing angle motion. The voice coil motor generally includes a coil and a yoke. The magnetic field generated by the magnetic field of the yoke interacts with the magnetic field produced by the magnetic poles to achieve a regular motion. In the existing voice coil motor structure, generally a single coil is energized. However, due to the limited power supply capacity of the chip, the single coil is energized with a limited capacity and cannot satisfy larger load requirements. To solve this problem, in the technical field, larger-sized chips are usually used for power supply. However, larger-sized chips mean a significant increase in cost.

SUMMARY

The main purpose of the present application is to provide a voice coil motor, a zoom lens and a photography device, which aims to solve the existing problem of significantly increased costs in existing voice coil motors that use large-sized chips to drive single coil motion.

In order to achieve the above objective, the present application provides a voice coil motor. The voice coil motor includes a machine shell, a magnet structure, a mover structure and a drive structure. The magnet structure is provided on the machine shell and includes an annular magnetic yoke. The mover structure includes a plurality of mover coils, and the plurality of mover coils are movably sleeved on a yoke section of the annular magnetic yoke. The drive structure includes a plurality of drive chips and the plurality of drive chips are electrically connected to the plurality of mover coils respectively.

In some embodiments, the plurality of mover coils are provided in parallel, and the mover structure further includes a mobile carrier connected to the plurality of mover coils.

In some embodiments, the mobile carrier includes a carrier plate, the carrier plate includes a plate body, the plate body is provided with a mounting surface, and a mounting protrusion extends from a middle of the mounting surface; and the plurality of mover coils includes two first mover coils, and the two first mover coils clamp on two opposite end surfaces of the mounting protrusion.

In some embodiments, peripheral surfaces of the two first mover coils are pressed against the mounting surface of the plate body.

In some embodiments, the two first mover coils are adhered to the plate body and/or the mounting protrusion.

In some embodiments, the mover structure further includes a plurality of mobile carriers, and the plurality of mobile carriers are respectively connected to the plurality of mover coils.

In some embodiments, the annular magnetic yoke includes a curved yoke body and a yoke cover. The curved yoke body includes two straight yoke sections and an arc-shaped yoke section, the two straight yoke sections are provided at interval along a width direction of the two straight yoke sections, and the arc-shaped yoke section is connected to two opposite ends of the two straight yoke sections. The yoke cover is configured to be detachably connected to the other two opposite ends of the two straight yoke sections.

In some embodiments, a matching groove is formed on the yoke cover, and a positioning protrusion corresponding to the matching groove is formed on the straight yoke section. When the yoke cover is connected to the two straight yoke sections, the positioning protrusion correspondingly extends into the matching groove.

In order to achieve the above objective, the present application further provides a zoom lens. The zoom lens includes the above-mentioned voice coil motor.

In order to achieve the above objective, the present application further provides a photography device. The photography device includes the above-mentioned zoom lens.

In the technical solution provided by the present application, a plurality of mover coils are used to replace the traditional single coil structure, and the plurality of mover coils are individually energized through the plurality of drive chips, thereby reducing the power supply pressure of the single chip, obtaining greater electromagnetic driving force as a whole to satisfy larger load requirements, and broadening the application range of the voice coil motor. At the same time, under the premise of the same overall driving energy, the total cost of a plurality of smaller driver chip is less than that of a single larger driver chip, thereby reducing production costs.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
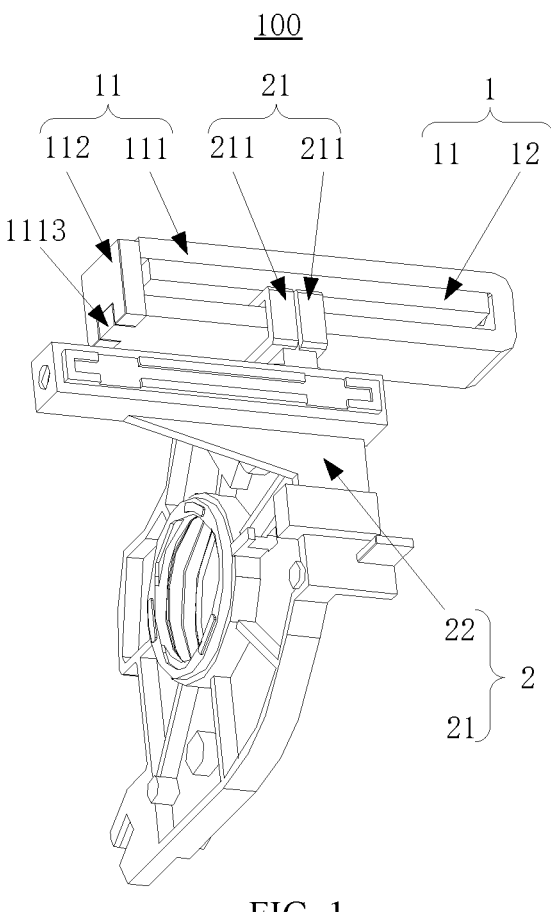
FIG. 1 is a schematic structural view of a voice coil motor (without a machine shell) according to some embodiments of the present application.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that if there are directional indications (such as up, down, left, right, front, rear, etc.) in the present application, the directional indications are only used to explain the relative positional relationship, movement situation, etc. among components in a specific attitude (as shown in the drawings). If the specific attitude changes, the directional indication also changes accordingly.

In addition, the descriptions related to "first", "second" and the like in the present application are merely for descriptive purposes, and should not be understood as indicating or implying their relative importance or implicitly indicating the number of technical features indicated. Therefore, the features defined by "first" and "second" may explicitly or implicitly include at least one such feature. In addition, "and/or" in the whole text includes three solutions, taking A and/or B as an example, including A technical solution, or B technical solution, or a technical solution that both A and B meet. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

A voice coil motor is a device that converts electrical energy into mechanical energy and achieves linear and limited swing angle motion. The voice coil motor generally includes a coil and a yoke. The magnetic field generated by the magnetic field of the yoke interacts with the magnetic field produced by the magnetic poles to achieve a regular motion. In the existing voice coil motor structure, generally a single coil is energized. However, due to the limited power supply capacity of the chip, the single coil is energized with a limited capacity and cannot satisfy larger load requirements. To solve this problem, in the technical field, larger-sized chips are usually used for power supply. However, larger-sized chips mean a significant increase in cost.

In view of this, the present application provides a voice coil motor, a zoom lens and a photography device, aiming to solve the problem of significantly increased costs in existing voice coil motors that use large-size chips to drive single coil movement. FIG. 1 to FIG. 5 are schematic structural views of the voice coil motor according to some embodiments of the present application.

As shown in FIG. 1 to FIG. 5, A voice coil motor 100 includes a machine shell, a magnet structure 1, a mover structure 2 and a drive structure. The magnet structure 1 is provided on the machine shell and includes an annular magnetic yoke 11. The mover structure 2 includes a plurality of mover coils 21, and the plurality of mover coils 21 are movably sleeved on a yoke section of the annular magnetic yoke 11. The drive structure includes a plurality of drive chips, and the plurality of drive chips are electrically connected to the plurality of mover coils 21 respectively.

In the technical solution provided by the present application, the plurality of mover coils 21 are used to replace the traditional single coil structure, and the plurality of mover coils 21 are individually energized through a plurality of drive chips, thereby reducing the power supply pressure of the single chip, obtaining greater electromagnetic driving force as a whole to satisfy larger load requirements, and broadening the application range of the voice coil motor 100. At the same time, under the premise of the same overall driving energy, the total cost of a plurality of smaller driver chip is less than that of a single larger driver chip, thereby reducing production costs.

In some embodiments, the plurality of mover coils 21 are provided in parallel, and the mover structure 2 also includes a mobile carrier 22 connected to the plurality of the mover coils 21. The mobile carrier 22 can be used as a carrier for a variety of mobile devices. Specifically, the mobile carrier 22 can be a moving frame on a zoom lens. The moving frame is provided with a zoom lens, and the moving frame can move along the extension direction of the yoke section to achieve zooming. In these embodiments, by connecting the mobile carrier 22 to the plurality of mover coils 21, the plurality of mover coils 21 move under the action of the magnetic field of a plurality of magnets 12 after being energized, thereby driving the mobile carrier 22 to move, further realizing zooming of the zoom lens.

In other embodiments, a plurality of the mover coils 21 are provided closely around each other, and the mover structure 2 further includes a mobile carrier 22 connected to a plurality of the mover coils 21. By tightly winding a plurality of the mover coils 21 in the same area, the power point of the mobile carrier 22 will not be changed when any of the mover coils 21 is powered off, thus ensuring the driving stability of the mobile carrier 22 to avoid jitter.

Figure 3:
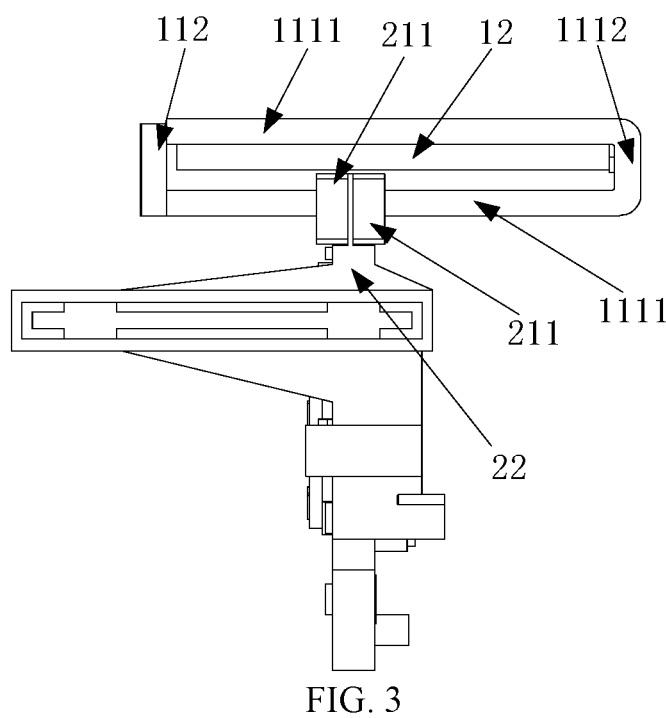
FIG. 3 is a front view of the voice coil motor in FIG. 1.
Figure 4:
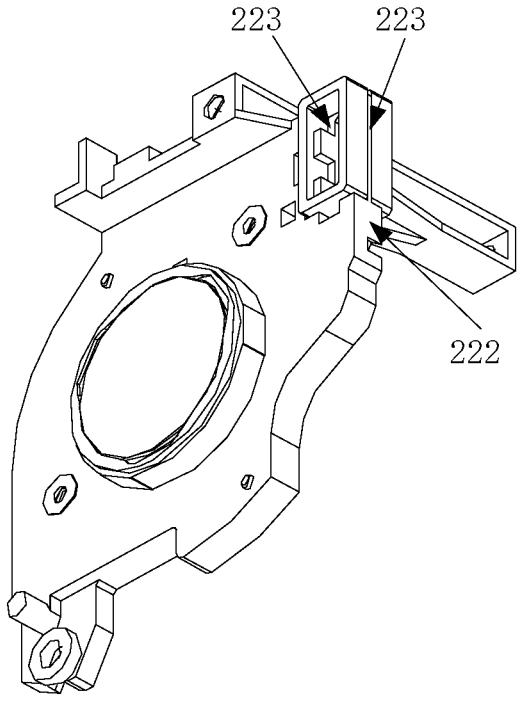
FIG. 4 is a schematic structural view of a mover structure (including a first mover coil) in FIG. 1.
Figure 5:
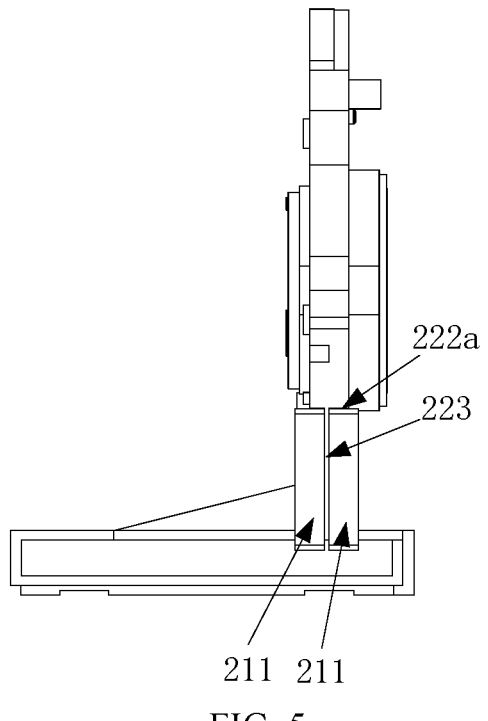
FIG. 5 is a front view of the mover structure in FIG. 4.

There are many ways of connecting the mobile carrier 22 to the plurality of mover coils 21. As shown in FIG. 3 to FIG. 5, in some embodiments, the mobile carrier 22 includes a carrier plate 221, the carrier plate 221 includes a plate body 222, the plate body 222 is provided with a mounting surface 222a, and a mounting protrusion 223 extends from a middle of the mounting surface 222a. The plurality of mover coils 21 includes two first mover coils 211, and the two first mover coils 211 clamp on two opposite end surfaces of the mounting protrusion 223. One mounting protrusion 223 can provide a mounting base for the two first mover coils 211, making maximum use of the mounting protrusion 223, thereby reducing the overall volume of the plate body 222 and reducing the complexity of the plate body 222 to facilitate the production of the plate body 222.

Figure 2:
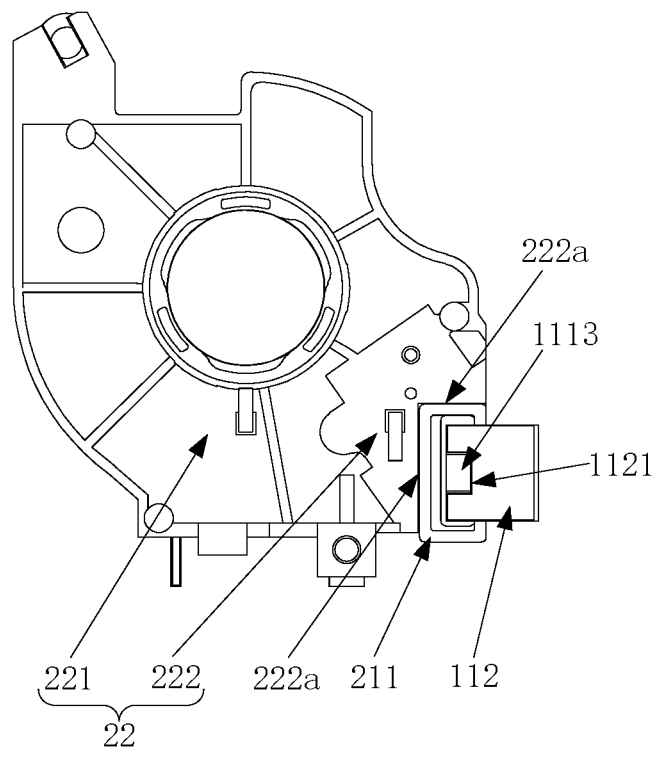
FIG. 2 is a side view of the voice coil motor in FIG. 1.

In some embodiments, as shown in FIG. 2 and FIG. 5, peripheral surfaces of the two first mover coils 221 are pressed against the mounting surface 222a of the plate body 222. The mounting surface 222a of the plate body 222 can limit the position of the first mover coil 211 and prevent the first mover coil 211 from being displaced.

In order to prevent the first mover coil 211 from being forced away from the carrier plate 221, in these embodiments, the two first mover coils 211 and the plate body 222 are adhered to each other, to ensure that the first mover coil 211 and the plate body 222 are firmly bonded.

In other embodiments, the two first mover coils 211 and the mounting protrusion 223 are adhered to each other, which can ensure that the first mover coils 211 and the mounting protrusion 223 are firmly bonded.

It should be noted that the above two parallel technical features "the two first mover coils 211 and the plate body 222 are adhered to each other" and "the two first mover coils

211 and the mounting protrusion 223 are adhered to each other" can be set selectively, or can be set at the same time. Obviously, the effect of being set at the same time is better, which can ensure a stable connection between the first mover coil 211 and the carrier plate 221.

In some embodiments, the mover structure 2 further includes a plurality of mobile carriers 22, and the plurality of mobile carriers 22 are respectively connected to the plurality of mover coils 21. In the technical solution of these embodiments, the plurality of mobile carriers 22 are respectively connected to the plurality of mover coils 21, so that the plurality of mover coils 21 can drive the plurality of mobile carriers 22 to move simultaneously or separately to achieve various driving methods. Specifically, when the mobile carrier 22 is used as a moving frame on a zoom lens, the moving frame is provided with a zoom lens, and the plurality of mover coils 21 respectively drive the zoom lens to move to achieve rapid zooming. At the same time, the magnetic structure 1 is fully utilized, which is beneficial to the miniaturization of the voice coil motor 100.

Since the annular magnetic yoke 11 needs to be provided in a closed loop to provide a large magnetic field, there are only two ways for the mover coil 21 to be placed on the yoke section, one of which is during the winding process, the mover coil 21 is directly wound around the yoke section; and the other of which is to arrange the annular magnetic yoke 11 in separate bodies. After the mover coil 21 is sleeved on the yoke section from the split opening of the annular magnetic yoke 11, then the annular magnetic yoke 11 is closed. The above two methods each have their own advantages and disadvantages. As shown in FIG. 3, in some embodiments, the annular magnetic yoke 11 includes a curved yoke body 111 and a yoke cover 112. The curved yoke body includes two straight yoke sections 1111 and an arc-shaped yoke section 1112, the two straight yoke sections 1111 are provided at interval along a width direction of the two straight yoke sections 1111, and the arc-shaped yoke section 1112 is connected to two opposite ends of the two straight yoke sections 1111. The yoke cover 112 is detachably connected to the other two opposite ends of the two straight yoke sections 1111. In the technical solution in these embodiments, before closing the annular magnetic yoke 11, the completed mover coil 21 can be sleeved on the straight yoke section 1111, and then the yoke cover 112 is connected to the two straight yoke sections 1111 to complete the sealing of the annular magnetic yoke 11. Compared with the method of directly winding wires on the yoke sections, the implementation process of the technical solution of these embodiments is relatively simple and the production efficiency is greatly improved. It can be understood that the yoke section includes two straight yoke sections 1111, and the extension direction of the straight yoke sections 1111 is the movement direction of the mover coil 21.

It can be understood that a plurality of the mover coils 21 is sleeved on one of the straight magnetic yoke sections 1111. The magnetic structure 1 also includes a magnet 12, and the magnet 12 is provided on the other straight magnetic yoke section 1111. Specifically, the magnet 12 is provided on the opposite end surfaces of the two straight yoke sections 1111. This arrangement can avoid excessive occupation of space caused by providing the magnet 12 on the outer side of the annular magnetic yoke 11. In this way, the overall volume of the voice coil motor 100 is reduced.

Further, there are various ways through which the yoke cover 112 can be detachably connected to the two straight yoke sections 1111. As shown in FIG. 1 and FIG. 2, in this embodiment, a matching groove 1121 is formed on the yoke cover 112, and a positioning protrusion 1113 corresponding to the matching groove 1121 is formed on the straight yoke section 1111. When the yoke cover 112 is connected to the two straight yoke sections 1111, the positioning protrusion 1113 correspondingly extends into the matching groove 1121. Under the action of the magnet 12, the curved yoke body 111 has magnetism, and the yoke cover 112 can be magnetically attracted to the two straight yoke sections 1111 along the magnetic poles of the two straight yoke sections 1111. Through the adaptive connection between the positioning protrusion 1113 and the matching groove 1121, it is possible limit the movement of the yoke cover 112 along the radial direction of the straight yoke section 1111, thereby ensuring that the connection between the yoke cover 112 and the curved yoke body 111 is stable.

The present application also provides a zoom lens, including the voice coil motor 100 as described above. Since this zoom lens adopts all the technical solutions of the embodiments of the voice coil motor 100 mentioned above, it has at least all the beneficial effects brought by the technical solutions of the above embodiments, which will not be described again here.

The present application also provides a photography device, including the zoom lens as described above. Since this photographic device adopts all the technical solutions of the embodiments of the zoom lens mentioned above, it has at least all the beneficial effects brought by the technical solutions of the above embodiments, which will not be described again here.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. A voice coil motor, comprising:
   a machine shell;
   a magnet structure provided on the machine shell and comprising an annular magnetic yoke;
   a mover structure comprising a plurality of mover coils, the plurality of mover coils being movably sleeved on a yoke section of the annular magnetic yoke; and
   a drive structure comprising a plurality of drive chips, the plurality of drive chips being electrically connected to the plurality of mover coils respectively;
   wherein a matching groove is formed on the yoke cover, and a positioning protrusion corresponding to the matching groove is formed on the straight yoke section,
   when the yoke cover is connected to the two straight yoke sections, the positioning protrusion correspondingly extends into the matching groove.

2. The voice coil motor of claim 1, wherein the plurality of mover coils are provided in parallel, and the mover structure further comprises a mobile carrier connected to the plurality of mover coils.

3. The voice coil motor of claim 2, wherein the mobile carrier comprises a carrier plate, the carrier plate comprises a plate body, the plate body is provided with a mounting surface, and a mounting protrusion extends from a middle of the mounting surface; and
   the plurality of mover coils comprises two first mover coils, and the two first mover coils clamp on two opposite end surfaces of the mounting protrusion.

4. The voice coil motor of claim 3, wherein peripheral surfaces of the two first mover coils are pressed against the mounting surface of the plate body.

5. The voice coil motor of claim 3, wherein the two first mover coils are adhered to the plate body and/or the mounting protrusion.

6. The voice coil motor of claim 1, wherein the mover structure further comprises a plurality of mobile carriers, and the plurality of mobile carriers are respectively connected to the plurality of mover coils.

7. The voice coil motor of claim 1, wherein the annular magnetic yoke comprises:

a curved yoke body comprising two straight yoke sections and an arc-shaped yoke section, the two straight yoke sections being provided at interval along a width direction of the two straight yoke sections, and the arc-shaped yoke section being connected to two opposite ends of the two straight yoke sections; and a yoke cover, configured to be detachably connected to the other two opposite ends of the two straight yoke sections.

8. A zoom lens, comprising the voice coil motor of claim 1.

9. A photography device, comprising the zoom lens of claim 8.

* * * * *